United States Patent Office 3,772,407
Patented Nov. 13, 1973

---

3,772,407
GLYOXAL SUBSTITUTED VINYL ALCOHOL-ACRYLAMIDE GRAFT POLYMERS
Laurence Lyman Williams, Stamford, and Anthony Thomas Coscia, Norwalk, Conn., assignors to American Cyanamid Company, Stamford, Conn.
No Drawing. Continuation-in-part of applications Ser. No. 745,486, July 17, 1968, now Patent No. 3,556,932, Ser. No. 761,798, Sept. 23, 1968, now Patent No. 3,597,313, and abandoned application Ser. No. 471,463, July 12, 1965. This application Jan. 18, 1971, Ser. No. 107,459
Int. Cl. C08f 15/10
U.S. Cl. 260—875     3 Claims

ABSTRACT OF THE DISCLOSURE

Water-soluble ionic vinyl alcohol polymers consisting essentially of (a) a vinyl alcohol acrylamide grafted linkages and (b) such linkages carrying a substantial number of glyoxal substituents to render the polymer thermosetting are wet strength agents for paper. Paper containing the polymer in thermoset and cellulose-reacted state loses about half of its wet strength on 24 hours of normal wet weathering, thereby alleviating the litter problem.

---

This is a continuation-in-part of our copending applications Ser. No. 745,486 (now U.S. Pat. No. 3,556,932), Ser. No. 761,798 (now U.S. Pat. No. 3,597,313) filed on July 17, 1968 and Sept. 23, 1968, respectively and Ser. No. 471,463 filed July 12, 1965, now abandoned.

The present invention relates to a new water-soluble substantially linear thermosetting water-soluble ionic polymer carrying acrylamide and glyoxalated amide substituents, wet strength paper having a content of said polymer and the processes involved in the manufacture of the polymer and the paper.

Our first filed patent application discloses that the water-soluble ionic polymers which consist essentially of linear vinyl "backbone" chains carrying glyoxalated amide substituents are valuable agents for use in the manufacture of paper. The application discloses that when water-laid webs of cellulose fibers which have an adsorbed content of said polymers are dried at normal temperatures in the range of 190°–250° F., the polymer molecules react with the cellulose and that in addition the polymer molecules cross-link among themselves, so that the resulting paper possesses very high wet strength. An important property of the polymers and of the wet strength paper is that about half of the wet strength which the polymer imparts and which the paper possesses is temporary and disappears when the paper is soaked in water for 24 hours at room temperature.

Permanent wet strength is often an unnecessary and an undesirable property. The working life of paper towels, napkins and "personal" tissue is rarely more than a few minutes, and a substantial part of the national litter problem results from the fact that discarded paper remains intact for a long period of time when discarded on the streets and in forests. Moreover, paper broke which possesses permanent wet strength is difficult to rework; cf. U.S. Pats. Nos. 2,394,273, 2,423,097 and 2,872,313. There is therefore, a demand for high wet strength paper which retains its wet strength during brief contact with moisture but which loses much of its strength after a short period of natural weathering. Our parent application provides paper of this character.

Our second filed patent application discloses that wet strength resins may advantageously contain vinyl alcohol linkages.

The present invention provides a new polymer which possesses substantially the same properties as the polymer of the two parent applications and which provides paper of similar wet strength properties as the paper of those applications.

The present invention is based on the discovery that the water-soluble non-thermosetting ionic polymer which consists essentially of vinyl alcohol-acrylamide graft linkages and such linkages carrying a sufficient number of glyoxal substituents to render the polymer thermosetting, is a valuable agent for improving both the wet and dry strength of paper.

The vinyl alcohol-acrylamide graft linkage has the probable theoretical formula (1)
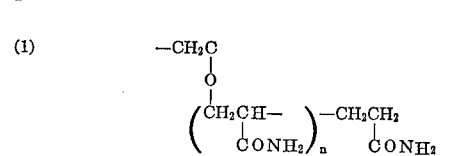

In the formula $n$ represents a value between zero and a large integer. The size of the integer is such that a 10% aqueous solution of the polymer in glyoxalated state is of pumpable viscosity. The polymer is of pumpable viscosity when $n$ is about 1500, and this is taken as the upper practical limit. The polymer possesses much better fluidity and nearly as good wet strengthening properties when $n$ is 50–100, and, therefore, this range is preferred. The possibility exists that the grafted acrylamide units are attached directly to the vinyl chain of the host polymer. The formula set forth above should, therefore, be regarded as suggestive of this possibility. In view of this uncertainty, the foregoing linkages will not be referred to by formula but by the term "vinyl alcohol-acrylamide graft linkages."

Moreover, the polymer contains a sufficient proportion of ionic substituents to render the polymer cellulose-substantive, alone or with alum, so that the polymer is suitable for use as a beater additive in the manufacture of paper. A variety of ionic substituents, both cationic and anionic, are suitable for the purpose, and the specific ionic substituent which is present in any instance is not a characterizing feature of the polymer.

The substituents introduced by the glyoxal have the theoretical formula:

(2)       —CHOHCHO and are attached to some or all of the amide substituents of the grafted acrylamide units. The units which carry these substituents have the theoretical formula:

(3)
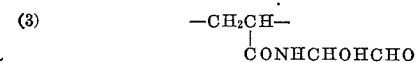

The polymer may also contain vinyl alcohol linkages having the theoretical formula:

(4)

These hydroxyl substituents of these linkages are sites with which the glyoxal substituents can react during the drying step and thereby form cross-linkages. These linkages, therefore, improve the thermosetting capability of the polymer.

In addition, the polymer may contain linkages which do not affect its essential character. Such linkages include vinyl acetate

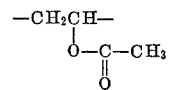

linkages, hydrophilic anionic linkages, for example

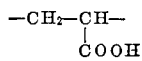

and hydrophilic cationic linkages, for example

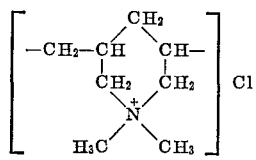

The polymer of the present invention is made in two principal steps.

In the first step, acrylamide is graft polymerized upon the vinyl alcohol linkages of a water-soluble polyvinyl alcohol, and sufficient acrylamide is grafted so that the resulting polymer is at least 25 mol percent composed of grafted acrylamide. The resulting polymer is water-soluble.

In the second step, the polymer is reacted with glyoxal in sufficient amount to render the polymer thermosetting.

The grafting or first step is conveniently performed by the method of Mino et al. U.S. Pat. No. 2,922,768 using polyvinyl alcohol (which may contain up to 25 mol percent of vinyl acetate linkages) as the starting polymer material. At least about a quarter of a mol of acrylamide is taken per vinyl alcohol linkage to ensure that an adequate number of functional (amide and glyoxalated amide) substituents is present in the final polymer.

The vinyl alcohol polymer used as the starting material may have any molecular weight, the higher molecular weight polymers producing (after the graft and glyoxalation reactions) products which are so viscous that they are difficult to pump as aqueous solutions of normal shipping polymer concentration (e.g. 10% by weight). Polymer solutions of much better pumpability characteristics are produced when the starting vinyl alcohol polymer is of low molecular weight. This has the advantage of permitting the amount of acrylamide which is grafted to be increased without increasing the viscosity of the final polymer solution beyond the limit of pumpability. Accordingly, we prefer that the molecular weight of the starting vinyl alcohol polymer be about 25,000 or less.

The pumpability of aqueous solutions in the resulting polymer after glyoxalation decreases as the amount of grafted acrylamide rises and the final polymer should be pumpable as a 10% by weight aqueous solution. The amount of grafted acrylamide should not be so large that the final polymer is of non-pumpable viscosity.

On the other hand, the wet strengthening properties of the polymer improves as the amount of grafted acrylamide rises, and we have found no limit to the improvement which can be effected by this means.

In practice, a compromise is necessary, and we prefer that the number of acrylamide units or residues in each grafted acrylamide chain be less than about 1,500. In this range the polymer (in glyoxalated state) possesses very satisfactory wet-strengthening properties, yet is readily pumpable as aqueous solutions of 10% solids content.

Cationic polymers within the scope of the present invention can be prepared by introducing cationic substituents into the polymer at any appropriate point during the synthesis. Means for introducing both cationic and anionic substituents are well known in the art. According to one method for introducing cationic substituents, the host polymer employed for the graft step is a polymer composed of vinyl alcohol and cyclized diallyl dimethyl ammonium chloride linkages (shown above) and is employed as the starting material. The polymer is graft polymerized with acrylamide and glyoxalated as has been described. Sufficient anionic substituents can be introduced by alkaline hydrolysis of a part of the amide substituents.

The polymer develops its wet-strengthening action both at room temperature and at the temperatures at which paper is customarily dried (190° F.–250° F.). It develops its strength in part by a cross-linking reaction with itself, and in part by reaction with the cellulose molecules of the fibers of which the paper is composed. It is an important property of the polymer that it loses about half of its wet strength on immersion in water at room temperature for 24 hours. Wet strength paper made by use of this polymer, therefore, presents less of a litter problem than is presented by wet strength paper wherein the polymer possesses permanent wet-strengthening properties.

Anionic substituents can be conveniently introduced by hydrolyzing an appropriate part of the carboxamide substituents introduced by the graft reaction. The linkages thereby affected are hereinafter termed for simplicity "hydrolyzed vinyl alcoholacrylamide graft linkages."

The number of ionic substituents (anionic or cationic) need be only sufficient to permit a substantial part of the polymer to be deposited on the fibers. In general, between 2 and 20 mol percent of ionic linkages based upon the total number of linkages in the polymer (including grafted acrylamide linkages) is sufficient for the purpose.

In the third step of the preparation, the amount of glyoxal which is reacted is at least about 0.05 mol of glyoxal per mol of amide substituents. The polymer possesses much better wet-strengthening properties when 10 to 50 percent of the amide substituents are glyoxalated, and this is, therefore, preferred.

The glyoxal can be reacted by adding the desired amount of glyoxal to a 10%–20% by weight solution of the grafted vinyl alcohol polymer at about pH 8, and allowing the solution to stand at 30°–50° C. until the solution has increased in viscosity but is short of the point at which it is an insoluble gel. It is not known which linkages are affected by the reaction. Therefore, the linkages affected are hereinafter designated "glyoxalated vinyl alcohol-acrylamide graft linkages."

Not all the amide substituents need be glyoxalated. The amide substituents which are not glyoxalated impart dry strengthening properties to the polymer and are sites with which a part of the gyoxal can react and thus effect cross-linkages.

The final polymer, therefore, consists essentially of ionic substituents and vinyl alcohol-acrylamide graft linkages (a) in unmodified state and (b) in glyoxalated state.

We prefer to employ as the starting or host polymer polyvinyl alcohol itself, since this polymer is commercially available and affords good results. This polymer is prepared by hydrolysis of polyvinyl acetate and may and usually does contain a minor proportion of residual vinyl acetate linkages.

It is unnecessary to conduct the graft reaction so as to introduce an acrylamide substituent into substantially each vinyl alcohol linkage. Very satisfactory results are obtained when 10 mol percent of the vinyl alcohol linkages are grafted.

The polymer before glyoxalation is stable both in dry state and in aqueous solution. In glyoxalated state the polymer is stable for at least one one week as a 10% by weight solution in water at room temperature at pH 4.

The polymers are used in the manufacture of paper by the procedures of our senior parent application. Thus, they may be added, in aqueous solution state, to a paper-making pulp, preferably at any point between the beater and the head box, for example at the head box or fan pump. In the case of the anionic polymers, sufficient alum is added to set the polymer on the fibers; generally this is similar to the amount needed to set an equal weight of rosin size on the fibers and is best added upstream from the point of which the polymer is added. The pH of the pulp, after addition of the alum and the polymer, should be in the range 4.0–5.5.

In the case of the cationic polymers, alum is omitted and the pH of the pulp is in the range 4 to 8.

Thereafter, the web is dried in accordance with standard practice, e.g., by passage for ¼–3 minutes over drying rolls having surface temperatures in the range of 190°–250° F. However, the heating step may be omitted and the paper may be dried at room temperature with development of good wet strength.

The amount of polymer added is typically 0.2%–2% of the dry weight of the fibers, as amounts within this range provide a very substantial benefit. Larger and smaller amounts can be used, and respectively provide greater and less benefit.

Neutral or alkaline paper of improved strength can be manufactured by use of the foregoing polymers by employing them as tub sizes. For this purpose, they are applied to preformed paper at the size press as aqueous solution having a pH in the range of 6–8 in amount sufficient to deposit an effective amount of the polymer on the fibers. Thereafter, the paper is dried as has been described.

The invention is further described by the examples which follow. These examples are best embodiments and are not to be construed in limitation thereof. Parts are by weight unless otherwise stated.

EXAMPLE 1

The following illustrates the preparation of a water-soluble anionic polyvinyl alcohol-acrylamide graft polymer containing a sufficient number of glyoxal substituents to be thermosetting.

A solution of 150 g. of polyvinyl alcohol (3.4 mol) having a molecular weight of about 25,000 and 150 g. of acrylamide (2.1 mol) in 1,000 cc. of water at 25° C. is purged of oxygen by means of a stream of nitrogen, and 120 cc. of a 0.1 M solution of ceric ammonium nitrate in 1 M nitric acid is added. After 45 minutes at 25° C. the solution is poured into 12 liters of acetone with stirring. The polymer precipitates. It is recovered by filtration, washed three times by agitation with acetone in a Waring Blendor, and dried. It weighs 239 g., equivalent to a yield of 80%, and is substantially composed of

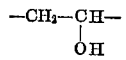

and

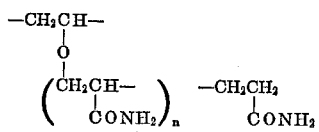

or

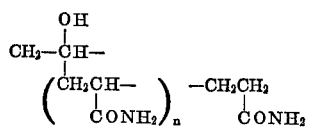

linkages, and is substantially non-ionic. The product contains 45% of combined acrylamide by weight.

A solution of 5.0 g. of the above-described graft product in 32.2 cc. of water containing 0.063 g. of NaOH (0.0016 mol) is heated at 95° C. for 1 hour. About 5% of the amide substituents are converted to —COONa substituents. The resulting polymer is anionic.

To the foregoing solution at room temperature is added 2.3 g. of 40% aqueous solution of glyoxal, and the pH of the resulting solution is adjusted to 7.3 by addition of dibasic sodium phosphate. The solution is heated at 35° C. for 20 minutes until the Gardner-Holdt viscosity of the solution is Zt. The reaction is then terminated by cooling and adjusting the pH of the solution.

EXAMPLE 2

The following illustrates the preparation of a cationic polymer according to the present invention.

The graft procedure of Example 1 is repeated, except that the starting vinyl alcohol polymer is composed of vinyl alcohol and diallyl dimethyl ammonium chloride linkages in 80:20 molar ratio.

To a solution of 100 g. of the product adjusted to 20% solids and pH 7.5 and heated to 40° C. is added 18 g. of glyoxal as a 40% solution in water. The solution is allowed to react until the viscosity of the solution increases substantially. The solution is then cooled to room temperature, diluted to 10% solids and adjusted to pH 3.5.

EXAMPLE 3

The following illustrates the preparation of paper having good wet strength by application of anionic polymer according to the present invention.

An aqueous suspension of well-beaten cellulose paper-making fibers is prepared having a consistency of 0.6%. To this is added first 0.5% of alum (decreasing the pH of the suspension to 4.5) and then 0.5% of the polymer of Example 1. Both materials are added as 5% solution in water, and weights are based on the dry weight of the fibers.

The suspension is then formed into handsheets at 50 lb. basis weight per 24" x 40"/500 ream, and the wet webs are dried for one minute on a rotary drum drier having a drum temperature of 230° F.

The resulting paper possesses a very satisfactory wet strength.

EXAMPLE 4

The following illustrates the preparation of wet alkaline strength paper by use of a cationic polymer according to the present invention.

The procedure of Example 3 is repeated except that the polymer is replaced by the polymer of Example 2, no alum is used, and the suspension is sheeted at a pH of 7.5. A similar product is obtained.

EXAMPLE 5

A sheet of untreated cellulose paper (filter paper) is impregnated with a 0.5% by weight aqueous solution of the polymer of Example 2, adjusted to pH 7.5 and the resulting wet web is dried at room temperature. The procedure is repeated except that the paper is dried at 100° C. Both sheets possess about equal wet strength.

We claim:

1. A water-soluble ionic vinyl alcohol polymer consisting essentially of (a) vinyl alcohol-acrylamide graft linkages, and (b) vinyl alcohol-acrylamide graft linkages carrying a sufficient number of glyoxal substituents in the range of 10% to 50% of the amide substituents present to render the polymer thermosetting, said acrylamide being graft polymerized upon a water-soluble ioic vinyl alcohol polymer as backbone.

2. A polymer according to claim 1 wherein the molecular weight of the said polymer, exclusive of the grafted acrylamide and glyoxal substituents, is between 1,000 and 5,000.

3. A polymer according to claim 1 containing vinyl alcohol linkages.

References Cited

UNITED STATES PATENTS

| | | | |
|---|---|---|---|
| 3,709,857 | 1/1973 | Faessinger | 162—167 |
| 2,922,768 | 1/1960 | Mino et al. | 260—875 X |
| 2,886,557 | 5/1959 | Talet | 260—72 |

MURRAY TILLMAN, Primary Examiner

J. SEIBERT, Assistant Examiner

U.S. Cl. X.R.

162—166, 167

UNITED STATES PATENT OFFICE
CERTIFICATE OF CORRECTION

Patent No. 3,772,407         Dated November 13, 1973

Inventor(s) LAURENCE LYMAN WILLIAMS and ANTHONY THOMAS COSCIA

It is certified that error appears in the above-identified patent and that said Letters Patent are hereby corrected as shown below:

Column 1, line 18. The definite article "a" should be deleted.

Column 6, line 14. Between "of" and "anionic" insert -- an --.

Column 6, line 52. "ioic" should read -- ionic --.

Signed and sealed this 14th day of May 1974.

(SEAL)
Attest:

EDWARD M. FLETCHER, JR.
Attesting Officer

C. MARSHALL DANN
Commissioner of Patents